United States Patent Office 3,451,976
Patented June 24, 1969

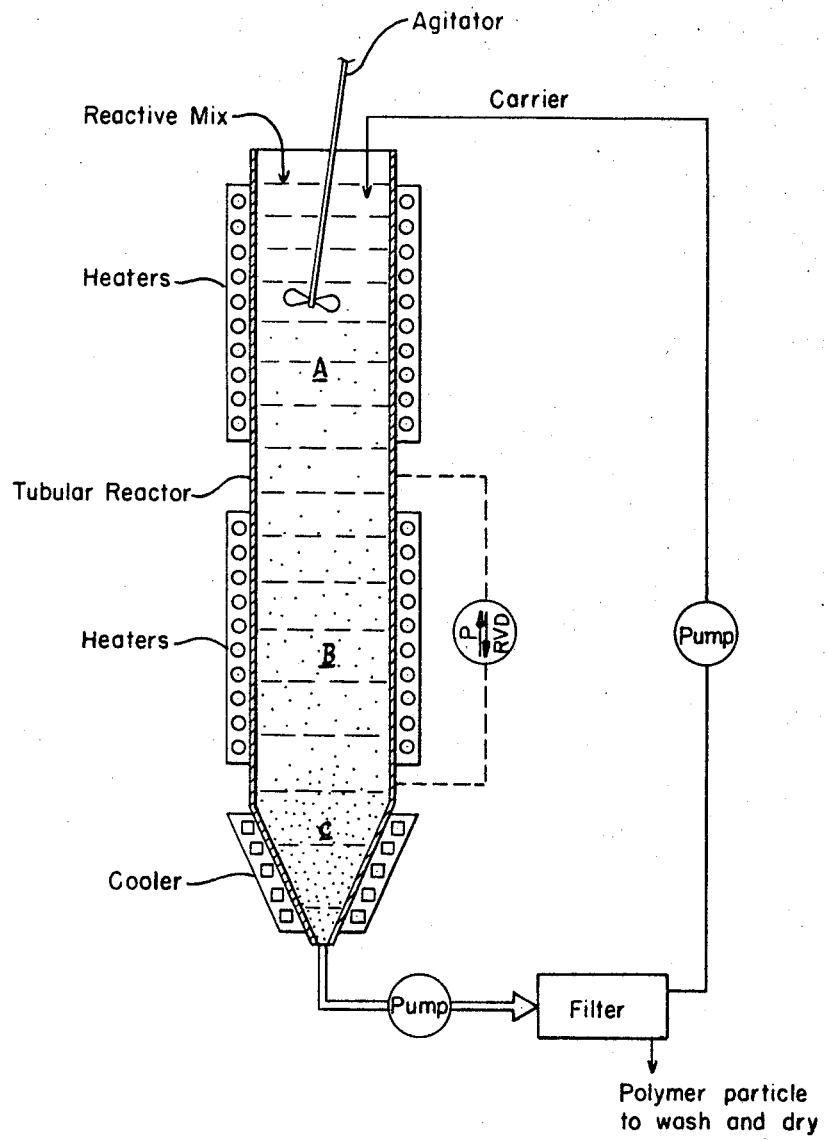

3,451,976
CONTINUOUS ANIONIC POLYMERIZATION
OF LACTAMS
Bennie M. Lucas, Hackensack, N.J., assignor to The Polymer Corporation, Reading, Pa., a corporation of Pennsylvania
Continuation-in-part of application Ser. No. 271,026, Apr. 5, 1963. This application Oct. 10, 1966, Ser. No. 585,361
Int. Cl. C08g 20/10, 20/14
U.S. Cl. 260—78     8 Claims

ABSTRACT OF THE DISCLOSURE

Finely divided polylactam particles are continuously produced in a reaction vessel by means of anionic polymerization techniques. The reaction is conducted while the reactants are suspended in a carrier liquid that is denser than the lactams but less dense than the polylactam particles. This permits continuous withdrawal of polymerization products from the reaction zone by gravimetric means.

---

This application is a continuation-in-part of my copending application Ser. No. 271,026, filed April 5, 1963, now abandoned.

This invention relates to a continuous process for forming discrete particles or powders. More particularly, this invention relates to a powder forming process in which higher lactams, as hereinafter defined, are continuously polymerized.

Lactams, i.e., inner amides of amino acids, can be polymerized by various known techniques, for example, see Dorr and Wiloth, Z. Physik. Chem. 8, 67–91, 1956, for a description of the polymerization of epsilon-caprolactam (ε-caprolactam) at elevated temperatures with water as a catalyst. The present invention, however, encompasses only the polymerization of higher lactams under substantially anhydrous conditions, and more particularly, the low temperature anionic polymerization of higher lactams under anhydrous conditions.

The low temperature anionic polymerization of lactams referred to above is disclosed, for example, in U.S. Patents 3,015,652; 3,017,391; 3,017,392; and 3,018,273.

Briefly, the above patents disclose the novel polymerization of higher lactams, i.e., lactams containing at least 6 carbon atoms in the lactam ring, as for example, ε-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido alkoxy, ether groups and the like, A and B, or A and R, together can form a ring system through a divalent linking group and any free valance bond of the A and B radicals can by hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids in the system which then require sufficient anionic catalyst to neutralize the organic acid in addition to the amount desired to function in the polymerization reactions.

It is an object of this invention to prepare, by a continuous method, discrete particles or powders.

It is a further object of this invention to prepare discrete particles or powders by continuously polymerizing higher lactams.

Another object of this invention is to provide methods and apparatus for the continuous production of polylactam particles that permits selective control over the size of such polylactam particles.

Yet another object of this invention is to provide methods and apparatus for the continuous production of finely divided polylactam particles.

A still further object of this invention is to prepare discrete particles or powders comprised of polylactams suitable for use in processes that require dry powders, such as fusion coating, pressing and sintering, etc.

Briefly, these and other objects of this invention are achieved by polymerizing a lactam while suspended in a carrier liquid within a reaction zone. By proper selection of the density of the carrier liquid and/or by the selective use of turbulence within the reaction zone, the rate at which the polymerized particles are settled out of the reaction zone can be controlled. As the particle size of the polymerized product will be dependent, to some degree, upon the detention time within the reaction zone, control is obtained over the particle size of the polymerized product. The polymerized product is collected after it has settled from the reaction zone, it is separated from the carrier liquid and residual monomer, and the carrier liquid and residual monomer are recycled, along with fresh reactive monomer, to the reaction zone. By these means, a continuous process for the production of fine powders is obtained.

With specific regard to the characteristics and properties of the carrier liquid, the following criterion may be set forth.

I. The carrier must be one which is compatible with the reactive mix (e.g., lactam, catalyst, and initiator or promoter compound) and with the resultant polymer. A carrier is ordinarily compatible if it does not appreciably decrease the polymerization rate which would obtain in the absence of a carrier, for example, by polymerizing in bulk. Generally, it may be stated that oxidants and compounds containing active hydrogen and hydroxyl groups will interfere with the desired low temperature anionic polymerization processes. However, the compatibility of the carrier liquid should be determined in each instance with regard to the specific catalyst and promoter used in the polymerization process.

II. The carrier should have a density which lies between the density of the higher lactam and the density of the powders or discrete particles (i.e., polymers). For example, in the case of epsilon-caprolactam, the density of which is 1.02 gm./ml. (molten @ 77° C.) and the polymer of epsilon-caprolactam, the density of which is approximately 1.13–1.16 gm./ml. (23° C.), the carrier density can vary from about 1.03 to about 1.12 gm./ml. It can be understood that if the density of the carrier liquid is greater than the density of the polymer, the polymer will not settle gravimetrically out of the zone. On the other hand, if the density of the carrier liquid is less than the density of the monomer, either monomer or undesirably small particles of polymer may settle out of the reaction zone. Thus, the selection of a carrier liquid of an appropriate density is of considerable importance in establishing a continuous process for the production of fine powders of a controlled particle size.

III. The carrier may be either soluble or miscible, or have characteristics lying between these, with the monomeric higher lactam, but it must be substantially inert towards, and a non-solvent for, the polymer.

IV. The carrier should preferably be one which is relatively easy to separate, for example by filtration, from the resultant polymeric powders or discrete particles.

V. The carrier should be thermally stable at polymerization temperatures, for example temperatures ranging from about 100° C. to 250° C.

There are many carriers which meet the above requirements, but in general, the preferred carriers are of the hydrocarbon type, either aliphatic or aromatic, or mixtures thereof. The following named carriers are given merely as examples of those which are particularly useful in the polymerization of caprolactam, but it is to be understood that the invention is not limited thereto.

| Trade name | Chemical name | Density at 20° C. (gm./ml.) |
|---|---|---|
| Panaflex BN-5 | Hydrocarbon-plasticizer | 1.05 |
| Nevillac 10 | Aromatic hydrocarbon condensate | 1.06–1.09 |
| Picco 25 and Picco 10 | Aromatic hydrocarbon | 1.07 |
| Kenflex A | Hydrocarbon, $CH_2C_{10}H_5(CH_3)_2$ | 1.09 |
| | Dipropyl phthlate, $C_6H_4(COOC_3H_7)_2$ | 1.07 |
| | Dibutyl phthlate, $C_{16}H_{22}O_4$ | 1.042–1.048 |
| | Diisobutyl phthlate, $C_{16}H_{22}O_4$ | 1.04 |
| | Diallyl phthlate | 1.120 |

In addition to selecting the density of the carrier liquid, the rate at which polymerized particles settle out of the reaction zone, can be controlled, at least in part, by means of turbulence established within the reaction zone. It will be appreciated that even though the polymer particles are denser than the carrier liquid, they can be detained therein for a further length of time by means of this turbulence. By detaining the particles within the reaction zone for a longer time, it is thought that additional polymerization will take place on the surface of the polymeric particles and thus enable the growth of larger sized particles. A further advantage is obtained by the retention of the polymeric particles within the reaction zone for a longer period of time since they will continue to form sites for the polymerization of additional quantities of monomer, thus increasing the volumetric efficiency of the process. By this is meant that the percent conversion from monomer to polymer will be greater.

The invention can better be understood with reference to the accompanying drawing in which a schematic flow sheet of the process is shown. In the figure, a tubular reactor is illustrated that is arbitrarily divided into three zones. The reaction zone A is shown at the top, a polishing zone B is shown toward the middle, and a collection zone C is shown at the bottom. It will be understood that there is, in practice, no sharp delineation between these zones and that the zones need not be equivalent to the volumes as illustrated. Provision is made to discharge materials from zone C, by way of a pump, to a filter. Another pump and conduit means are provided to return the filtrate from the filter to the reaction zone A. Additionally, conduit means are provided to introduce reactive monomer into the reaction zone A and a suitable impeller device is included within the reaction zone A. The zones of the reactors are provided with heat exchange devices that variously can add heat or take heat away from the various zones, as may be required.

In operation, a mixture of carrier liquid and reactive monomer is introduced into zone A that is maintained at a temperature suitable to initiate the polymerization reaction. Since the mixture has not as yet polymerized, it will be less dense than the carrier liquid and will not settle out of the reaction zone A. As the polymerization starts and continues, however, discrete particles of polymer begin to form which, if unhindered, will settle gravimetrically from the reaction zone down into the polishing zone B. The detention time of these particles within the reaction zone A is controlled not only by selecting the density of the carrier liquid, but also by the degree of turbulence imparted to the reaction zone A by means of the impeller or other suitable agitation device. Quite generally, the detention time of the polymeric particles within the reaction zone A will be increased by selecting a carrier liquid of greater density and/or by increasing the degree of turbulence within the reaction zone A. As mentioned above, longer detention time within the reaction zone A will result not only in larger polymeric particles, but also will enable a more complete reaction of the monomer within the zone, thus increasing the volumetric efficiency of the process.

After the polymeric particles have been detained for a suitable time within the reaction zone A, the particles settle gravimetrically therefrom into the polishing zone B where some additional polymerization takes place. During the final stages of polymerization, the polymeric particles settle into zone C which is comprised predominantly of polymeric particles along with carrier and unreacted monomer. The polymeric particles, any unreacted monomer, and the carrier liquid are then withdrawn from the bottom of the reactor by means of a pump and sent to a filter for separation and discharge of the polymeric particles. The carrier liquid and any unreacted monomer are recycled to the top of the reactor and are there introduced, along with fresh makeup quantities of reactive monomer. It should be understood that as used herein, the phrase "reactive monomer" refers to a mixture of a higher lactam, a catalyst for the low temperature anionic polymerization of such lactam, and a promoter for the low temperation anionic polymerization of such lactam. It is necessary only to raise such reactive mixture to suitable reaction temperatures to cause the polymerization to begin.

EXAMPLE 1

A polymerizable mix of dry epsilon-caprolactam monomer (molecular weight or m.w.=113.16) containing 1/100 of a mole of phenyl isocyanate, m.w.=119.05, promoter (initiator) per mole of monomer (used in its salt or concentrate form, i.e., as sodium caprolactam, m.w.=135) is prepared. Portions of this mix are continuously withdrawn, heated to about 120° C., and admitted to the top of a tubular reactor as shown in the accompanying drawing, at a rate of about 100 moles of monomer per hour, or total weight of 11570 gms. of polymerizable mix per hour. The reactor was initially filled with about 12000 gms. of carrier, in this case dibutyl phthlate. The temperature is gradually raised from about 120° C. in the top of zone A of the reactor to about 150° C. in the middle or B zone, due to the exothermic nature of the reaction and the heaters surrounding these zones. Polymer particles are discernable, after a few minutes, in the A zone and these particles begin to grow as polymerization continues in zone B and zone C. At the same time the particles now begin to slowly settle by gravity means toward the bottom of the reactor. The C zone was cooled so that the temperature of the exit stream, in this example, was about 120–125° C.

The exit stream is continuously passed to the filter and the polymer particles separated and then washed and dried. The particles, approximately 100–250 mesh (U.S. Sieve Series) formed excellent coatings on metallic substrates when applied by flame spraying or by the fluidized bed coating method (see Gemmer patent U.S. 2,844,489). The powders can also be used to form pressed and sintered parts.

Conversion of monomer to polymer in this example is about 80%, and the balance of unreacted monomer dispersed in the separated carrier along with carrier, is then continuously recycled to the top of the reactor, as shown after removal from the filter. Retention time in the reactor in this example is about one hour.

EXAMPLE 2

Example 1 was repeated except that the carrier was Kenflex A, a liquid hydrocarbon type carrier having a density of 1.09 at 20° C. After steady-state conditions were attained, conversion rates of 80–90% were maintained.

EXAMPLE 3

The procedure of Example 1 was repeated except the initial temperature in zone A was raised to 135° C. and the concentration of catalyst increased to 1/50 of a mole per mole of monomer. Conversion of monomer was 85–90% and the throughput almost doubled, i.e., the detention time in the reactor was now about ½ hour.

EXAMPLE 4

Example 1 was repeated with diphenyl urea promoter (initiator) substituted for the phenyl isocyanate. Polymer particles were produced having a relative viscosity of about 30.

In the practice of this invention, powdered polymer can be obtained in varying sizes, for example, from about 40–400 mesh (U.S. Sieve Series). Using a carrier whose density is closer to the polymer density will permit a longer detention time and also, generally, larger particles, and conversely, use of carrier whose density is closer to the monomer density will give a lesser detention time and a generally smaller particle size.

Control over the detention time may also be obtained, as noted above, by the degree of turbulence maintained within the reaction zone A. The effect of the turbulence is to induce rising currents within the liquid that will oppose or hinder the free settling of the polymeric particles. The means for inducing these rising currents is illustrated in the drawing as a mixing impeller, though it is to be understood that it is within the scope of the invention to utilize other means, such as, for example, the ebullition of dry, inert gases (e.g., nitrogen) through the reaction zone.

The relative proportions of the lactams which are to be polymerized into discrete polymer particles and the carrier can be varied over wide limits. Suitable proportions are, for example, about 10 to 70% of the lactam and about 90 to 30 % of carrier.

The relative viscosity of the polyamide or polylactam particles produced according to this invention generally is at least about 10 and may vary up to about 80 or substantially higher. Relative viscosity is determined at 25° C. by means of capillary type Cannon-Fenske viscometer using an 8.4% weight solution of the polymer particles in 90% formic acid (5.5 grams of polymer particles in 50 ml. of 90% formic acid). Relative viscosity is calculated according to the following formula:

$$Nr = Ns/Nf$$

where $Nr$=Relative viscosity of the polymer-formic acid solution.
$Ns$=Absolute viscosity of the formic acid solution.
$Nf$=Absolute viscosity of the formic acid.

Although not shown in the drawing, the heat extracted in the cooling means about the lower part of zone C can be used as part of the heat for zones A and B. Also shown, in the dotted lines in the drawings, is an optional recycle or reverse bypass loop for passing a portion of the reacting mass from polishing zone B back to reaction zone A, thus permitting a longer detention time and more accurate control of particle size. It is also possible, by using a reversible variable delivery pump, as shown, to operate this bypass in a forward direction, i.e., from zone A to zone B, thus giving more flexibility to the system.

In summary, the invention contemplates a continuous process for the preparation of finely divided polylactam particles. The process is made continuous by reacting a lactam in a carrier liquid that is less dense than the polylactam particles so that the polylactam particles can gravimetrically settle out of the reaction. Control over the size of the polylactam particles is obtained by adjusting the length of time that the particles are detained within the reaction zone. Generally, the longer the particles are detained within the reaction zone, the larger they will grow and the greater will be the conversion from monomer to polymer. The detention time can be adjusted by hindering the free settling of the polylactam particles from the reaction zone, as by induced turbulence and the like, and/or by selecting a liquid carrier having a density greater than that of the monomer. It is within the scope of this invention to use the above two techniques for maintaining the polylactam particles in the reaction zone either alone or in combination, although in the preferred practice of this invention, they are used in combination.

As will be apparent to those skilled in the art, many modifications, changes and alterations are possible without departing from the spirit and scope of this invention.

I claim:

1. A continuous process for the production of discrete particles of a polymer of a higher lactam by utilizing low temperature anionic polymerization processes for the polymerization of such higher lactams conducted under substantially anhydrous conditions and below the melting point of said polymer, comprising the steps of:

introducing said higher lactam, an anionic catalyst for the polymerization of said lactam, and a promoter compound to promote the rapid polymerization of said lactam, into the reaction zone of a reaction vessel that contains a liquid carrier, said liquid carrier being characterized in that:

it has a density less than the density of said polymer and a density greater than the density of said higher lactam;

it is a non-solvent for said polymer;

it is compatible with said polymerization process; and it is thermally stable at polymerization temperatures;

maintaining a temperature within said reaction zone that is above the temperature at which polymerization of said higher lactam will take place, but below the melting point of said polymer;

polymerizing said lactam within said reaction zone to form said particles;

gravimetrically settling said particles from said reaction zone to a lower zone of said reaction vessel;

discharging from said lower zone a mixture of said particles, said carrier liquid and unreacted lactam, catalyst and promoter; and separating said particles from the liquid content of said discharged mixture.

2. A continuous process according to claim 1 in which said liquid content of said discharged mixture is recycled back to the reaction zone of said reaction vessel.

3. A continuous process according to claim 2 in which fresh quantities of said higher lactam, catalyst and promoter are mixed with said liquid content of said discharged mixture.

4. A continuous process according to claim 1 in which said discharged mixture is cooled below polymerization temperatures.

5. A continuous process according to claim 1 in which said higher lactam is epsilon-caprolactam.

6. A continuous process according to claim 5 in which the density of said carrier is in a range of from about 1.03 g./ml. to about 1.12 g./ml.

7. A continuous process according to claim 1 in which turbulence is induced in the reaction zone to oppose, at least in part, the free gravimetric settling of said particles.

8. A continuous process according to claim 1 in which a portion of the contents of the reaction zone are withdrawn from the reaction zone at one elevation and returned to the reaction zone at a different elevation.

References Cited

UNITED STATES PATENTS

| | | | |
|---|---|---|---|
| 2,562,796 | 7/1951 | Koch | 260—78 |
| 2,681,897 | 6/1954 | Frazier et al. | 260—31.2 |
| 3,061,592 | 10/1962 | Schnell et al. | 260—78 |
| 3,298,977 | 1/1967 | Robertson et al. | 260—78 |
| 3,325,455 | 6/1967 | Warner | 260—78 |

HAROLD D. ANDERSON, *Primary Examiner.*

U.S. Cl. X.R.

260—95, 33.6, 31.8